United States Patent
Schopp

(10) Patent No.: US 7,447,698 B2
(45) Date of Patent: Nov. 4, 2008

(54) METHOD FOR BALANCING BINARY SEARCH TREES

(75) Inventor: Joel Howard Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/301,727

(22) Filed: Dec. 13, 2005

(65) Prior Publication Data

US 2007/0136341 A1 Jun. 14, 2007

(51) Int. Cl.
*G06F 7/00* (2006.01)
*G06F 17/00* (2006.01)

(52) U.S. Cl. .................. 707/101; 707/102; 707/103 R; 709/203

(58) Field of Classification Search ............... 707/1–10, 707/100–104.1; 709/201, 203
See application file for complete search history.

(56) References Cited

U.S. PATENT DOCUMENTS

| 5,694,591 A * | 12/1997 | Du et al. ................ 707/2 |
| 5,987,468 A * | 11/1999 | Singh et al. ................ 707/100 |
| 6,188,696 B1 * | 2/2001 | Moran et al. ................ 370/410 |
| 6,229,791 B1 * | 5/2001 | Nusekabel et al. .......... 370/252 |
| 6,337,862 B1 * | 1/2002 | O'Callaghan et al. ....... 370/392 |
| 2002/0087564 A1 * | 7/2002 | Khanna et al. .............. 707/100 |
| 2004/0141509 A1 * | 7/2004 | Sahni et al. ................ 370/401 |

OTHER PUBLICATIONS

"Application Of Splay Trees to Data Compression", (ACM, vol. 31, No. 8, Aug. 1988), pp. 996-1007, by Douglas W. Jones.*
Sleator et al., "Self Adjusting Binary Search Trees", Journal of the Association for Computing Machinery, vol. 32, No. 3, Jul. 1985, New Jersey, pp. 652-686.

* cited by examiner

*Primary Examiner*—Charles Rones
*Assistant Examiner*—Daniel Kuddus
(74) *Attorney, Agent, or Firm*—Duke W. Yee; Matthew W. Baca; Mari A. Stewart

(57) ABSTRACT

Method for balancing a binary search tree. A computer implemented method for balancing a binary search tree includes locating a node in a binary search tree, determining whether a depth of the located node is greater than a threshold, and performing balancing operations. If the depth of the located node is greater than the threshold, the balancing operations may include a modified semi-splay balancing procedure. Regardless of depth, localized balancing operations may be performed while locating a node.

9 Claims, 4 Drawing Sheets

METHOD FOR BALANCING BINARY SEARCH TREES

BACKGROUND OF THE INVENTION

1. Field of the Invention

The present invention relates generally to the data processing field, and more particularly, to a method for balancing a binary search tree.

2. Description of the Related Art

A binary search tree is a data structure for representing tables and lists so that items in the tables or lists can be easily accessed, added and deleted. A binary search tree contains a set of the items in a particular table or list, with one item per node of the tree. The items are arranged on the tree in a symmetric order. For example, if a node x of the tree contains a specific item i, the left sub-tree of x will contain items less than item i, and the right sub-tree will contain items greater than item i.

When a binary search tree becomes unbalanced, the time required to do a look-up can increase significantly. For example, a project that may require only seconds to complete using a balanced tree may require minutes or even hours to complete with an unbalanced tree. As a result, balancing a binary search tree is an important and pervasive problem, and many solutions have been proposed over the years. In general, however, the proposed solutions are non-optimal in that they often perform differently on different workloads and frequently introduce significant overhead.

One mechanism for improving efficiency in balancing a binary search tree is to use a self-adjusting data structure in which a restructuring rule is applied during each operation in order to improve the efficiency of future operations. The publication "Self Adjusting Binary Search Trees", Daniel Dominic Sleator and Robert Endre Tarjan, *Journal of the Association for Computing Machinery*, Vol. 32, No. 3, July, 1985, pp. 652-686, hereinafter referred to as "Sleator", describes a self-adjusting form of binary search tree referred to as a "splay" tree. The heuristic used in restructuring a splay tree is referred to as "splaying", and involves balancing a tree by moving an accessed node to the root of the tree by performing a sequence of rotations bottom-up along a path from the node to the root. The "bottom-up splaying process" is described in detail in the publication.

Sleator also recognizes that a possible drawback of splaying is that the process requires a large amount of restructuring; and, thus, significantly increases overhead. Sleator therefore proposes modifying the restructuring rules of the splaying process to move the accessed node only part way to the root. This balancing process is referred to as "bottom-up semisplaying", and has the effect of reducing the depth of every node on the access path to, at most, about half of its previous value. Although bottom-up semisplaying can provide a reduction in overhead as compared to splaying, it is still computationally intensive.

There is, accordingly, a need for a mechanism for balancing a binary search tree that is effective in substantially all environments, and that reduces the overhead involved in balancing a tree.

SUMMARY OF THE INVENTION

The present invention provides a method for balancing a binary search tree. A computer implemented method for balancing a binary search tree includes locating a node in a binary search tree, determining whether a depth of the located node is greater than a threshold, and performing balancing operations. If the depth of the located node is greater than the threshold, the balancing operations may include a modified semi-splay balancing procedure. Regardless of depth, localized balancing operations may be performed while locating a node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
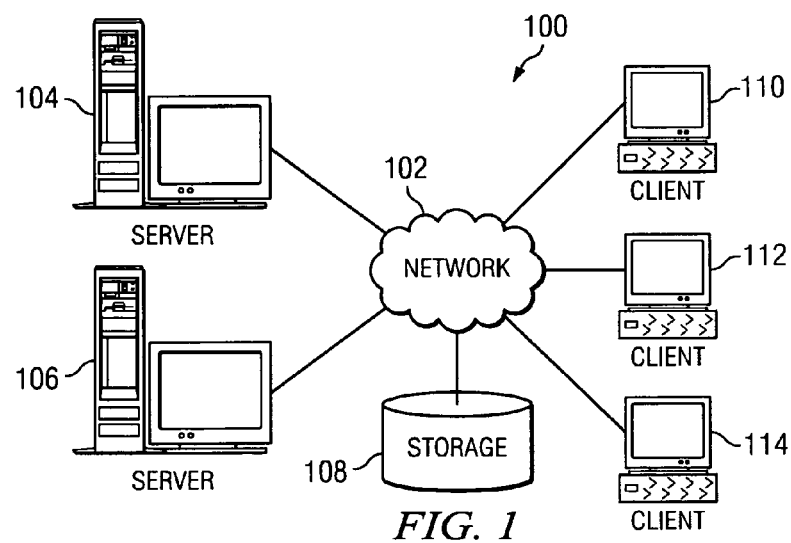
FIG. 1 depicts a pictorial representation of a network of data processing systems in which aspects of the present invention may be implemented.
Figure 2:
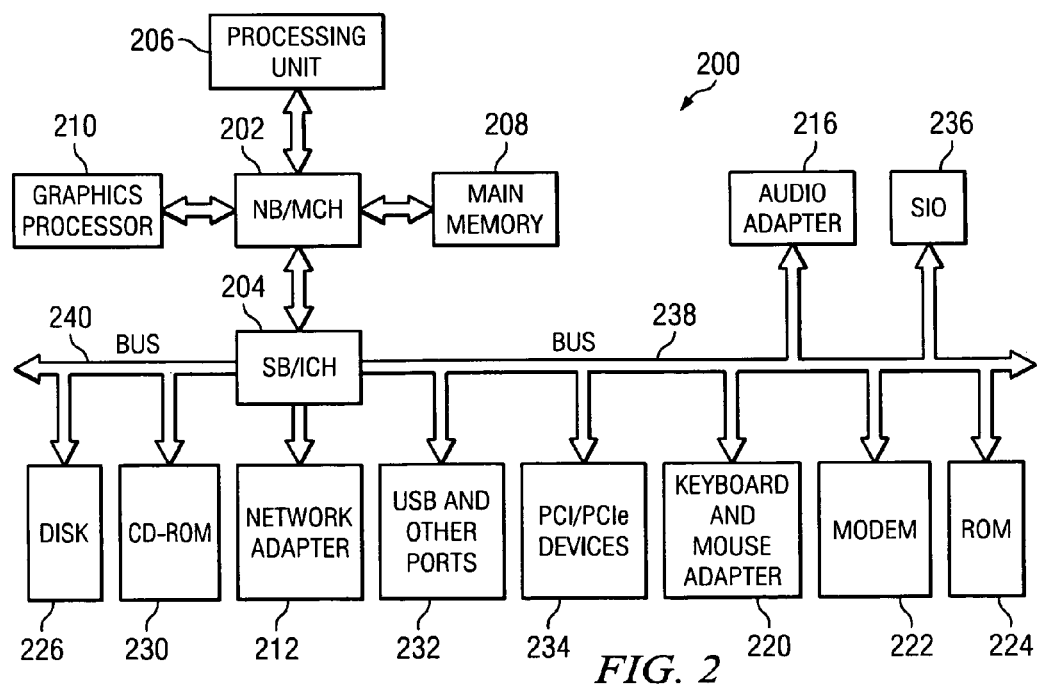
FIG. 2 depicts a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java® programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a method for balancing a binary search tree in a data processing system, such as, for example, data processing systems 100 and 200 illustrated in FIGS. 1 and 2. Certain exemplary embodiments of the present invention provide a "modified bottom-up semi-splaying" process for balancing binary search trees, and build upon the concepts and procedures described in the Sleator publication referenced above. Other exemplary embodiments of the invention are independent in origin and can be used on their own or in combination with other balancing techniques such as modified bottom-up semi-splaying.

In order to assist in understanding the present invention, it is important to understand the three primary design goals met by the invention:

Goal 1 Trees that do not need balancing should have no balancing operations performed on them;

Goal 2 Determining if a tree does not need balancing should be a low cost, constant overhead; and Goal 3 Trees do not need to be perfectly balanced, but should be reasonably balanced and avoid degenerative unbalance.

The present invention modifies the algorithms described in Sleator and provides new complementary but independent algorithms to provide a series of improvements that achieves the above design goals.

In accordance with exemplary embodiments of the present invention, Goal 1 is achieved by triggering tree manipulations only when a tree becomes unreasonably unbalanced. Achieving this goal requires defining and monitoring "unreasonably unbalanced", and the present invention achieves Goal 2 by providing a mechanism that does so in an efficient, low cost manner. Goal 3 is achieved by a first mechanism that improves the amount a semi-splay sequence restores balance to a tree by reducing the number of times semi-splay operations are needed to reduce imbalance, and a second mechanism that complements the first mechanism to further improve tree balance, particularly in a worst case scenario.

As indicated above, a modified semi-splay tree balancing operation is performed only when a tree becomes abnormally unbalanced, i.e., when there is an abnormally long access to an item in the tree. Additionally, the present invention determines when a tree should be balanced by a mechanism that is low in cost and that has a constant overhead.

The ideal maximum weight of a perfectly balanced binary tree is defined by cieling (lg(n)), which can be performed in two very fast assembly instructions on Power PC, clz (count leading zeros) and sub (subtract). A simple counter during any search of the tree will determine the weight w(i) of the item being searched. A simple counter that is incremented when items are inserted and decremented when items are removed will determine n. Thus, according to an exemplary embodiment of the present invention, splaying is performed when the weight of the item being searched w(i)>=c* cieling (lg(n))+e. Although semi-splaying can be performed at any desired depth without departing from the scope of the invention, inasmuch as semi-splay reduces the depth of the nodes by about half, as indicated previously, it is generally desirable to semi-splay when the depth is about double the ideal depth. This has been confirmed by experimentation setting c=1 and e=lg(n). Additional tuning can also be done with this equation. For example, e could be expanded to be max (5, lg(n)) to impose minimum heuristics.

Once it is determined that a splaying operation should be performed to balance an unreasonably unbalanced binary search tree; various balancing procedures are performed depending on the item being accessed, its relationship with respect to the root of the tree, and on other factors. Some of these procedures are the same as disclosed in Sleator, while others differ from Sleator in such a way as to improve the overall balancing process. FIGS. 3-11 are diagrams that schematically illustrate steps for balancing a binary search tree comparing known bottom-up semi-splay balancing procedures with modified bottom-up semi-splay balancing procedures according to exemplary embodiments of the present invention.

Figure 3:
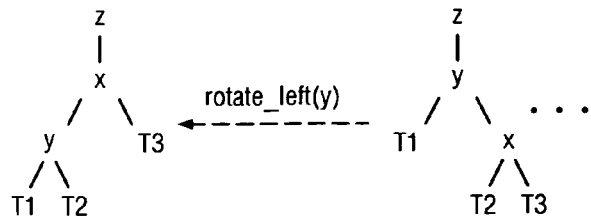
FIGS. 3-11 are diagrams that schematically illustrate steps for balancing a binary search tree comparing known bottom-up semi-splay balancing procedures with modified bottom-up semi-splay balancing procedures according to exemplary embodiments of the present invention.
Figure 4:
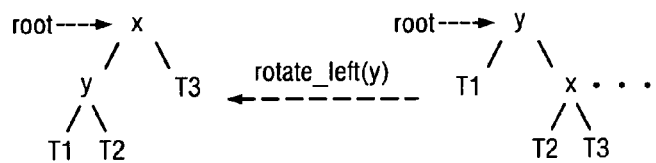
Figure 5:
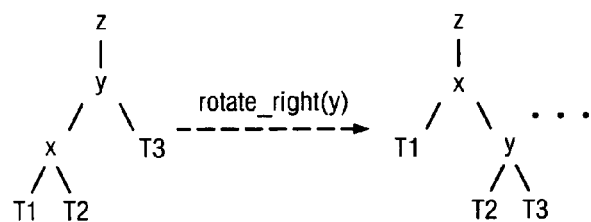
Figure 6:
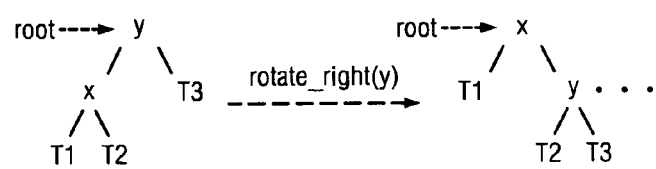

FIGS. 3-6 schematically illustrate known balancing procedures described in Sleator for cases wherein the parent y of an item x being accessed is the tree root. In such cases, the edge joining x with y is rotated (this is referred to as a "zig" in Sleator). Specifically, FIG. 3 illustrates a process of left rotating the sub-tree spanned by the given node x, and FIG. 4 illustrates the root case for the left rotation to move node x to the root of the tree. Similarly, FIG. 5 illustrates right rotating the sub-tree spanned by the given node x, and FIG. 6 illustrates the root case for the right rotation to move node x to the root of the tree. It should be noted that the zig operations illustrated in FIGS. 4 and 6 are the same as those illustrated and described in Sleator, and are also used in similar situations to balance a binary search tree in the present invention.

Figure 7:
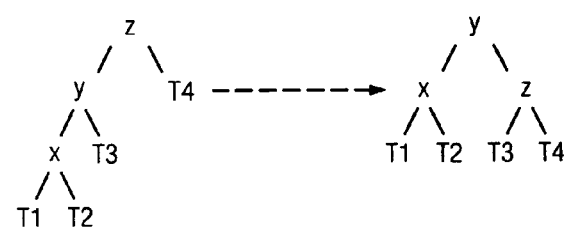
Figure 8:
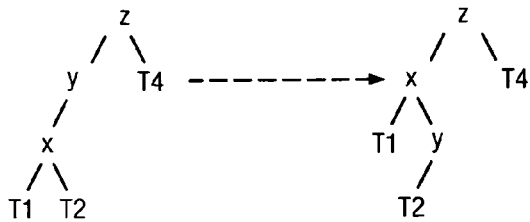

FIGS. 7-8 schematically illustrate the case wherein the parent y of the node x being accessed is not the tree root, and wherein x and y are left children of the tree root z. In particular, FIG. 7 illustrates a standard semi-splay operation described in Sleator in which the edge joining the parent y with the grandparent z is rotated, and then the edge joining x with y is rotated (this is referred to as a "zig-zig" operation in Sleator).

It is relatively common, however, where the parent's right child is NULL (i.e., does not contain an item) and the grandparent's right child is not NULL as shown in FIG. 8. In this case, as shown in FIG. 8, and according to an exemplary embodiment of the present invention, it is better to rotate on y, the parent of x, and promote z, the grandparent. This maintains the semi-splay properties, but is more efficient than the standard semi-splay zig-zig operation illustrated in FIG. 7. In this modification, sub-tree T1 has its weight reduced by 1, sub-trees T2 and T4 remain unchanged, and the only weight increase occurs in the NULL sub-tree. The average and maximum depth are guaranteed to not worsen, and if T1 is not NULL, it is guaranteed to improve.

Figure 9:
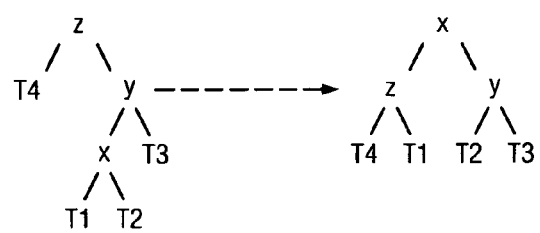
Figure 10:

FIG. 9 illustrates a zig-zag procedure for balancing a binary tree as described in Sleator. As explained in Sleator, this procedure is followed when y is not the root, x is the left child and y the right child or vice versa. In the procedure, the edge joining x with y is rotated, and then the edge joining x with the new y is rotated. FIG. 10 illustrates a zag-zag procedure described in Sleator and comprises the mirror of the procedure illustrated in FIG. 7.

Figure 11:
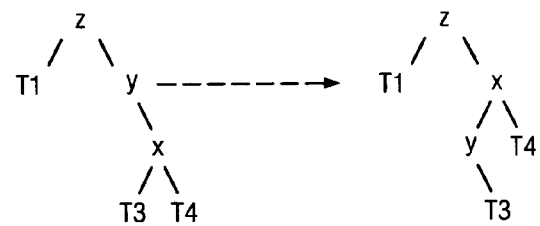

FIG. 11 illustrates a zag-zag procedure for balancing a binary tree, according to an exemplary embodiment of the present invention that improves on the zag-zag procedure illustrated in FIG. 10 in the case where y's left child is a NULL and z's left child is not a NULL. It should be noted that the procedure shown in FIG. 11 is a mirror of the procedure illustrated in FIG. 8, and in this case also, it is better to rotate on y, the parent of x, and promote z, the grandparent.

In general, experimentation has proven the balancing procedures illustrated in FIGS. 8 and 11 to be quite successful. The procedures have produced trees which are more balanced as judged by maximum depth in all tested workloads as compared to when conventional semi-splay procedures are used. The procedures require no extra rotations, and only an extra comparison or two on data which has already been fetched. The better balance achieved by the balancing procedures illustrated in FIGS. 8 and 11 can cut down on the number of semi-splay operations that would otherwise be required, resulting in an increase in performance. Furthermore, the better balance achieved cuts down on the number of comparisons needed to search or insert, which also increases performance.

The balancing algorithm described above runs very rarely and is very tolerant to the tree being improved underneath it. As a result, additional improvements that run independently of the semi-splay process can also be provided so long as they do not interfere with the effectiveness of semi-splay.

Every time a search of or insert into a binary search tree is performed, on the order of lg(n) nodes are looked at. According to further exemplary embodiments of the invention, the information that is gathered is used to further improve binary tree balancing. In particular, it has been recognized that by looking at only the last three nodes along the access path, situations can be identified where the tree can be made better (i.e., how the total weight and maximum individual weight of the tree can be improved). The procedure is very inexpensive, and often very effective.

FIGS. 12-15 are diagrams that schematically illustrate complementary and independent balancing rules for balancing a binary search tree according to exemplary embodiments of the present invention. It should be understood that the balancing rules illustrated in FIGS. 12-15, and referred to herein as "no uncle load balancing", are independent of the semi-splay procedures described in Sleator and of the modified semi-splay procedures described above. They can be used on their own, if desired, or in combination with other balancing techniques such as the modified bottom-up semi-splaying technique described with reference to FIGS. 3-11.

Figure 12:
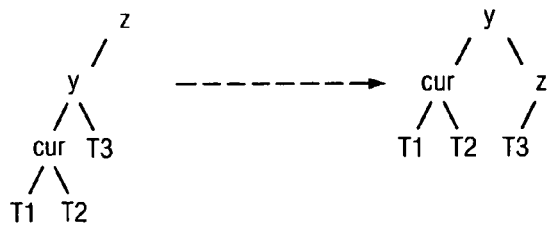
FIGS. 12-15 are diagrams that schematically illustrate complementary and independent balancing rules for balancing a binary search tree according to exemplary embodiments of the present invention.
Figure 13:
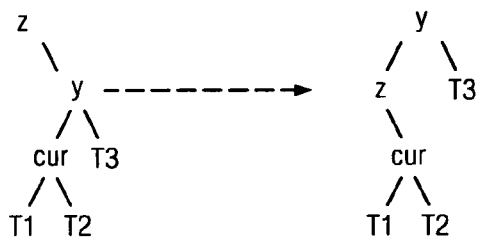

FIG. 12 illustrates a no uncle load balancing procedure for a zig-zig operation in which the grandparent has a NULL child. FIG. 13 illustrates the procedure for a zig-zag operation where the grandparent has a NULL child (this operation should not be performed, however, if T3 in FIG. 13 is not an actual tree since it is all that gets promoted).

Figure 14:
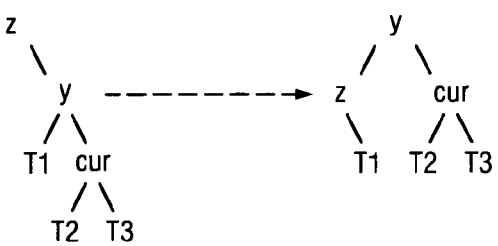
Figure 15:
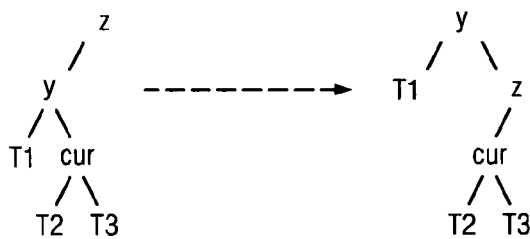

FIG. 14 is a mirror case of FIG. 12 and illustrates the no uncle load balancing operation in the case of a zag-zag operation where the grandparent has a NULL for its other child; and FIG. 15 is the mirror case of FIG. 13 and illustrates a zag-zig operation where the grandparent has a NULL for its other child.

Figure 16:
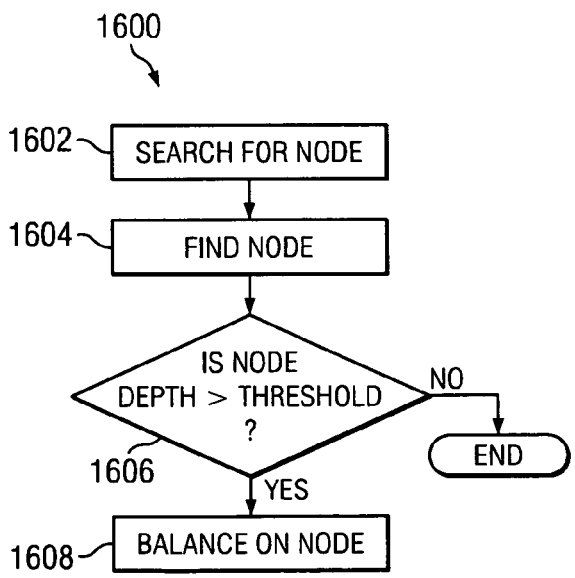
FIG. 16 is a flowchart that illustrates a method for balancing a binary search tree according to an exemplary embodiment of the present invention.

FIG. 16 is a flowchart that schematically illustrates a method for balancing a binary search tree according to an exemplary embodiment of the present invention. The method is generally designated by reference number 1600, and includes steps for determining when a node of a binary search tree should be balanced, and for thereafter performing a balancing operation.

The method begins by searching for a node in a binary search tree in a conventional manner, while keeping track of depth as the search is performed (Step 1602). The process is continued until a node is found (Step 1604). A determination is then made whether the node depth is greater than a threshold (Step 1606). If the node depth is not greater than the threshold (No output of Step 1606), the method ends for that node. If the node depth is greater than the threshold (Yes output of Step 1606), a balancing operation is performed on the node (Step 1608). Step 1608 may include the modified bottom-up semi-splaying balancing procedures described with reference to FIGS. 3-11 and may be performed alone or in conjunction with the no uncle load balancing procedures described with reference to FIGS. 12-15, which can be performed in conjunction with Step 1602. The no uncle load balancing operation may also be performed alone or in conjunction with other tree balancing procedures.

The present invention thus provides a method for balancing a binary search tree. A computer implemented method for balancing a binary search tree includes locating a node in a binary search tree, determining whether a depth of the located node is greater than a threshold, and performing balancing operations. If the depth of the located node is greater than the threshold, the balancing operations may include a modified semi-splay balancing procedure. Regardless of depth, localized balancing operations may be performed while locating a node.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for balancing a binary search tree, comprising:

locating a node in a binary search tree to form a located node;

determining whether a depth of the located node is greater than a threshold, wherein determining whether the depth of the located node is greater than the threshold comprises determining by how much the depth of the located node is greater than an ideal maximum depth of a perfectly balanced binary tree, and wherein determining by how much the depth of the located node is greater than the ideal maximum depth of the perfectly balanced binary tree comprises determining whether the depth of the located node is at least a desired amount greater than an ideal maximum depth of a reasonably balanced binary tree; and performing a modified semi-splay balancing operation if the depth of the located node is greater than the threshold, wherein performing a modified semi-splay balancing operation further comprises:

responsive to a parent of the located node not being a root of the binary search tree, a right child of the parent being a NULL, and a right child of a grandparent of the located node not being a NULL, rotating the binary search tree on the parent and promoting the grandparent; and responsive to a left child of a parent of the located node being a NULL and a left child of a grandparent of the located node not being a NULL, rotating the binary search tree on the parent and promoting the grandparent.

2. The computer implemented method according to claim 1, wherein determining whether the depth of the located node is at least a desired amount greater than an ideal maximum depth of a reasonably balanced binary tree, comprises:

determining whether the depth of the located node is at least twice an ideal maximum depth of a reasonably balanced binary tree.

3. The computer implemented method according to claim 1, and further comprising:

responsive to a child of a grandparent of a current node being a NULL, rotating the binary search tree on a grandparent of the current node.

4. The computer implemented method according to claim 3, wherein a current node comprises a node encountered while locating a node in the binary search tree.

5. A computer program product in a computer storage medium, wherein the computer program product is executed by a processor, the computer program product comprising:

a computer readable medium including computer usable program code for balancing a binary search tree, the computer program product comprising:

computer usable program code configured to locate a node in a binary search tree;

computer usable program code configured to determine whether a depth of the located node is greater than a threshold, wherein the computer usable program code configured to determine whether the depth of the located node is greater than the threshold comprises computer usable program code configured to determine by how much the depth of the located node is greater than the ideal maximum depth of thea perfectly balanced binary tree, and wherein the computer usable program code configured to determine by how much the depth of the located node is greater than an ideal maximum depth of a perfectly balanced binary tree comprises computer usable program code configured to determine whether the depth of the located node is at least a desired amount greater that an ideal maximum depth of a reasonably balanced binary tree; and computer usable program code configured to perform a modified semi-splay balancing operation if the depth of the located node is greater than the threshold, wherein the computer usable program code configured to perform a modified semi-splay balancing operation further comprises:

responsive to a parent of the located node not being a root of the binary search tree, a right child of the parent being a NULL, and a right child of a grandparent of the located node not being a NULL, computer usable program code configured to rotate the binary search tree on the parent and promoting the grandparent; and responsive to a left child of a parent of the located node being a NULL and a left child of a grandparent of the located node not being a NULL, computer usable program code configured to rotate the binary search tree on the parent and promote the grandparent.

6. The computer program product according to claim 5, wherein the computer usable program code configured to determine whether the depth of the located node is at least a desired amount greater that an ideal maximum depth of a reasonably balanced binary tree, comprises:

computer usable program code configured to determine whether the depth of the located node is at least about twice an ideal maximum depth of a reasonably balanced binary tree.

7. The computer program product according to claim 5, and further comprising:

if a child of a grandparent of the a current node is a NULL, computer usable program code configured to rotate the binary search tree on a grandparent of the current node.

8. The computer program product according to claim 7, wherein a current node comprises a node encountered while locating a node in the binary search tree.

9. A computer implemented method for balancing a binary search tree, comprising:

locating a node in a binary search tree to form a located node;

determining whether a depth of the located node is greater than a threshold, wherein determining whether the depth of the located node is greater than the threshold comprises determining by how much the depth of the located node is greater than an ideal maximum depth of a perfectly balanced binary tree, wherein determining by how much the depth of the located node is greater than the ideal maximum depth of the perfectly balanced binary tree comprises determining whether the depth of the located node is at least a desired amount greater than an ideal maximum depth of a reasonably balanced binary tree, and wherein determining whether the depth of the located node is at least twice an ideal maximum depth of a reasonably balanced binary tree; and performing a modified semi-splay balancing operation if the depth of the located node is greater than the threshold, wherein performing a modified semi-splay balancing operation further comprises:

responsive to a parent of the located node not being a root of the binary search tree, a right child of the parent being a NULL, and a right child of a grandparent of the located node not being a NULL, rotating the binary search tree on the parent and promoting the grandparent;

responsive to a left child of a parent of the located node being a NULL and a left child of a grandparent of the located node not being a NULL, rotating the binary search tree on the parent and promoting the grandparent; and responsive to a child of a grandparent of a current node being a NULL, rotating the binary search tree on a grandparent of the current node, wherein a current node comprises a node encountered while locating a node in the binary search tree.

* * * * *